Patented Jan. 22, 1952

2,583,010

UNITED STATES PATENT OFFICE 2,583,010

SYNTHESIS OF TRYPTOPHANE

Joseph W. Opie, Donald T. Warner, and Owen A. Moe, Minneapolis, Minn., assignors to General Mills, Inc., a corporation of Delaware No Drawing. Application November 22, 1948, Serial No. 61,518

3 Claims. (Cl. 260—319)

The present invention relates to the synthesis of tryptophane from compounds having the following formula:

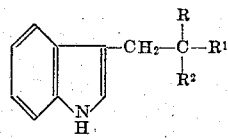

in which R and $R^1$ are selected from the group consisting of carboxylic acid ester, nitrile, and carbonamide, and $R^2$ is N-acyl. The preparation of compounds of this type and the conversion of them to tryptophane has been reported in the literature (Snyder and Smith, J. A. C. S. 66, 350 (1944)). The conversion of these compounds to tryptophane according to the above referred to article has been carried out in a series of steps and has involved cumbersome and tedious procedure. According to that article, ethyl-alpha-acetamido-alpha-carbethoxy - beta-(3-indole)-propionate was converted to alpha-acetamido-alpha-carboxy-beta-(3-indole)- propionic acid by refluxing in caustic soda, after which the reaction mixture was acidified to precipitate the substituted propionic acid, which was then recovered and purified. The substituted propionic acid was then converted to N-acetyl tryptophane by refluxing in water for an extended period of time. The N-acetyl tryptophane was then hydrolyzed to tryptophane by treatment with sodium hydroxide, and the product worked up in the usual manner.

It has now been found that it is possible to avoid much of this tedious procedure by carrying on the entire reaction in a single reaction mixture without any intermediate isolation or purification of the reaction product. The invention will be described with particular reference to the conversion of ethyl-alpha-acetamido-alpha-carbethoxy-beta-(3-indole)-propionate, although it is to be understood that the invention is also applicable to other compounds coming within the scope of the general formula hereinbefore set forth.

According to the present invention, the above propionate compound is dissolved in an alkaline solution and refluxed for an extended period of time. Thereafter the reaction mixture is acidified with a strong acid such as concentrated hydrochloric acid until a pH of approximately 1.5 is attained. It has been found that pure alpha-acetamido - alpha-carboxy-beta-(3-indole)-propionic acid obtained by repeated crystallization, has a titration curve indicating that a pH of approximately 1.5 is necessary for the compound to exist as the free acid. This discovery is utilized in the present invention and the reaction mixture is adjusted to a pH of about 1.5 so that subsequent decarboxylation may be effected in the free acid state. This decarboxylation may be effected by simply heating the reaction mixture to reflux temperature for a period of several hours. Thereafter the solution is made alkaline and the reaction mixture again heated to reflux temperature for several hours further. This alkaline reaction results in the hydrolysis of the acetyl group and converts the compound into the sodium salt of tryptophane. The sodium salt is then converted to tryptophane by the addition of a weak organic acid such as glacial acetic acid. The tryptophane thus liberated is precipitated and may be collected by filtration, and may be purified by recrystallization in the conventional manner.

The following example will serve to illustrate the invention:

EXAMPLE

Conversion of ethyl-alpha-acetamido-alpha-carbethoxy - beta - (3 - indole) -propionate to dl-tryptophane without isolation of the intermediate substituted malonic acid One hundred grams of the recrystallized ethyl-alpha - acetamido-alpha-carbethoxy-beta-(3-indole)-propionate were dissolved in an alkaline solution containing 50 g. of sodium hydroxide and 425 cc. of water. The resulting reaction mixture was refluxed for four and one-half hours and then treated with 2 g. of activated carbon. After filtration the light yellow filtrate was cooled to 10° C. Concentrated hydrochloric acid was added in portions until a pH of 1.48 was attained. The concentrated hydrochloric acid was added at such a rate that the temperature did not exceed 15° C. The resulting semi-solid reaction mixture was heated in an oil bath to reflux temperature. The resulting light yellow solution was refluxed for two and one-half hours. When the source of heat was removed, the reaction mixture set to a solid crystalline mass. An alkaline solution containing 48 g. of sodium hydroxide in 80 cc. of water was then added and the reaction mixture was heated to the reflux temperature. After the reflux temperature had been maintained for a period of 18 hours, the reaction mixture was mixed with 3 g. of activated carbon. Filtration yielded a light yellow filtrate which was acidified with the calculated quantity of glacial acetic acid. The addition of the glacial acetic acid caused the formation of a copious quantity of precipitate. After cooling for four hours in an ice bath, the crude dl-tryptophane was collected by filtration and dried in vacuo. The dl-tryptophane thus obtained weighted 49.8 g. and was purified in the following manner.

Forty-nine and eight-tenths grams (49.8 g.) of the crude dl-tryptophane were dissolved in 400 cc. of water containing 15 g. of sodium hydroxide. The resulting solution was mixed with 2 g. of activated carbon and filtered. The filtrate was mixed with 200 cc. of ethanol and heated to 70° C. Acidification with 22.5 g. of glacial acetic acid yielded the crystalline dl-tryptophane in the form of small platelets. After cooling, the crystalline dl-tryptophane was collected by filtration and washed with water and dried in vacuo. The dried product weighed 41.7 g. and melted at 273-76° C. with decomposition.

It is apparent from the above description that the present invention provides a novel process for preparing tryptophane from ethyl-alpha-acetamido - alpha - carbethoxy - beta - (3 - indole)-propionate and related compounds. The entire conversion is carried out in a single reaction mixture without any intermediate isolation of reaction products. Excellent yields of high quality product are obtained with a minimum of effort and with a minimum of loss of product.

While various modifications of the invention have been described, it is to be understood that the invention is not limited thereto, but that other embodiments of the invention may be made without departing from the spirit thereof.

We claim as our invention:

1. Process of preparing tryptophane from compounds having the following formula:

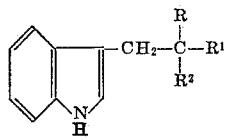

in which R and $R^1$ are selected from the group consisting of carboxylic acid ester, nitrile, and carbonamide, and $R^2$ is N-acyl, which comprises treating said compound with an aqueous alkaline solution under reflux conditions for an extended period of time to effect hydrolysis thereof, thereafter acidifying the reaction mixture to a pH of approximately 1.5, refluxing the reaction mixture at this pH for an extended period of time to effect decarboxylation, thereafter rendering the reaction mixture alkaline and subjecting it to further reflux to effect hydrolysis of the N-acyl group, then acidifying and cooling the reaction mixture to precipitate tryptophane, the entire process being carried out without isolation of any intermediate product.

2. Process of producing tryptophane from ethyl - alpha - acetamido - alpha - carbethoxy-beta-(3-indole)-propionate which comprises subjecting said compound to hydrolysis under reflux conditions for an extended period of time in an aqueous sodium hydroxide solution, thereafter reducing the pH of the reaction mixture to approximately 1.5, maintaining the reaction mixture at this pH at a reflux temperature for an extended period of time to effect decarboxylation, thereafter rendering the reaction mixture alkaline and subjecting it to a reflux temperature for a further extended period of time to affect hydrolysis of the acetamido group, and thereafter acidifying and cooling the reaction mixture to precipitate tryptophane, the entire process being carried out without isolation of any intermediate product.

3. Process of producing tryptophane which comprises dissolving ethyl - alpha - acetamido-alpha - carbethoxy - beta - (3 - indole) - propionate in an aqueous sodium hydroxide solution, refluxing the resulting reaction mixture for several hours, cooling the reaction mixture to about 10° C., adding concentrated hydrochloric acid thereto until a pH of approximately 1.5 is attained, refluxing the resultant reaction mixture for several hours, thereafter adding an aqueous sodium hydroxide solution to the reaction mixture and continuing the reflux for a further period of several hours, thereafter acidifying the reaction mixture with glacial acetic acid to precipitate tryptophane, and recovering the tryptophane, the entire process being carried out without isolation of any intermediate product.

JOSEPH W. OPIE.
DONALD T. WARNER.
OWEN A. MOE.

REFERENCES CITED

The following references are of record in the file of this patent:

UNITED STATES PATENTS

| Number | Name | Date |
|---|---|---|
| 2,447,545 | Snyder et al. | Aug. 24, 1948 |
| 2,468,912 | Albertson | May 3, 1949 |

OTHER REFERENCES

Albertson et al.: J. Am. Chem. Soc., vol. 67, pp. 36, 37 (January 1945).